United States Patent [19]
Woolf

[11] Patent Number: 4,618,032
[45] Date of Patent: Oct. 21, 1986

[54] TWO BELTED SUPERMARKET CHECKOUT SYSTEM

[75] Inventor: Robert M. Woolf, Cincinnati, Ohio

[73] Assignee: The Kroger Co., Cincinnati, Ohio

[21] Appl. No.: 590,165

[22] Filed: Mar. 16, 1984

[51] Int. Cl.$^4$ .............................................. A47F 9/04
[52] U.S. Cl. ...................................... 186/61; 186/63; 186/68
[58] Field of Search .................................. 186/59–69, 186/39; 198/599; 235/454

[56] References Cited

U.S. PATENT DOCUMENTS

| 3,083,791 | 4/1963 | Shoffner | 186/65 |
| 3,094,191 | 6/1963 | Potrafke | 186/59 |
| 3,186,515 | 6/1965 | Potrafke | 186/59 |
| 3,792,757 | 2/1974 | Musser | 186/64 |
| 3,899,687 | 8/1975 | Jones | 235/454 X |
| 4,007,809 | 2/1977 | Göransson | 186/63 |
| 4,043,426 | 8/1977 | Verkler | 186/61 |
| 4,061,205 | 12/1977 | Musser | 186/68 |
| 4,105,096 | 8/1978 | Baugh et al. | 186/63 |
| 4,138,000 | 2/1979 | Hartup | 186/61 |
| 4,173,274 | 11/1979 | Kantarian | 198/599 |
| 4,182,433 | 1/1980 | Foster | 186/68 |
| 4,236,604 | 12/1980 | Warner | 186/61 |
| 4,392,553 | 7/1983 | Foster | 186/61 |
| 4,401,189 | 8/1983 | Majewski | 186/69 X |

OTHER PUBLICATIONS

"IBM Technical Disclosure Bulletin" vol. 19, No. 9, Feb. 1977, Laurer.

Primary Examiner—Joseph J. Rolla
Assistant Examiner—Kevin P. Shaver
Attorney, Agent, or Firm—Cushman, Darby & Cushman

[57] ABSTRACT

A supermarket-type checkout counter facilitates two-handed scanning of merchandise coded indicia by an operator to speed up and simplify supermarket checkout procedures. A scanner is mounted in a module which, with a side live conveyor, a rear live conveyor, and a side conveyance table, define a workplace for the operator. A flat plate portion of the scanner is angled toward the operator. On the opposite side of the scanner from the workplace a vertical wall defines an area for receipt of an elevated-basket shopping cart. A side of the shopping cart is pivoted out of the way and an operator standing in the workplace can easily reach over the scanner to access merchandise within the cart, and move it over the scanner. Four columns elevate the basket of the cart from a wheeled base, and cooperating cams on the front of the cart and the rear of another cart effect pivotal movement of the basket about a horizontal axis into a nesting configuration. The side live conveyor defining the workplace is mounted so that it will pivot about a horizontal axis to allow or prevent egress from or ingress to the workplace.

17 Claims, 7 Drawing Figures

TWO BELTED SUPERMARKET CHECKOUT SYSTEM

BACKGROUND AND SUMMARY OF THE INVENTION

Supermarket operators desire checkout procedures that are as quick and simple as possible so as to maximize productivity, and minimize consumer waiting time. To this end there have been a number of technological advances in recent years, one of the most significant of which is the development of suitable scanners for reading indicia associated with merchandise to automatically register the correct price for the merchandise, and facilitate inventory control. In supermarket checkout counters utilizing scanners, typically a conveyor belt conveys merchandise directly to the front of the scanner, at which point the operator removes the merchandise from the conveyor belt and moves it over a horizontally extending flat plate associated with the scanner. If a mechanism exists for a two-handed procedure, the operator can be moving one item over the scanner with one hand, while depositing another item in an accumulation area and reaching to move a third item into operative association with the scanner with the other hand.

According to the present invention a supermarket checkout counter, and a shopping cart designed for use therewith, which facilitate easy two-handed scanning procedures by the check-out person, and in general minimize the time associated with a checkout procedure, are provided.

According to the present invention, a supermarket checkout counter is provided which includes the conventional components of a scanning means mounted in a scanner module, a keyboard, receipt printer, and a cash drawer. Means are provided, such as wall and support structures, and the like, for defining a workplace at which an operator can be positioned to readily access the scanner, keyboard, cash drawer, etc. Conveyance means are provided leading away from the scanner ultimately to a merchandise accumulation area, at which the merchandise may be bagged.

According to the present invention, a generally vertically extending wall is provided on the opposite side of the scanner from an operator positioned in the workplace, which wall defines an open area adapted to receive an elevated-basket shopping card. Thus instead of a live conveyor mechanism leading to the scanner and the operator removing merchandise to be scanned from the conveyor, the operator removes the merchandise directly from the shopping cart. The flat plate of the scanner module is slanted toward the operator to facilitate the scanning operation as the operator moves an article of merchandise from the elevated basket into operative association with the scanner, and then ultimately to the conveyance means.

In order to facilitate two-handed scanning procedures, two conveyance paths are provided. The first path on one side of the workplace can merely be a stationary horizontal surface which leads directly to the article accumulation area. The second path is defined by first and second live conveyance mechanisms (e.g. conveyor belts), the first live conveyance mechanism being disposed on the opposite side of the workplace from the stationary horizontal conveyance surface, and the second live conveyance mechanism is disposed behind an operator positioned in the workplace (i.e. on the opposite side of the workplace from the scanner). The second live conveyance mechanism leads to the common merchandise accumulation area, and an angled vertical wall facilitates transfer of merchandise from the first live conveyance mechanism to the second. The first live conveyance mechanism is preferably mounted for pivotal movement about a horizontal axis to allow, or block, egress from and ingress into the workplace.

The shopping cart according to the invention includes a wheeled bottom frame, a basket having front and rear walls and first and second side walls, a handle associated with the rear wall, and support between the bottom frame and the basket. The first side of the basket is movable between a first position wherein it forms a side of the basket, to a second position wherein it allows free access to articles within the basket. A plurality of vertically extending support columns extend from the base to the basket and support the basket on the second side thereof, so as not to interfere with the checkout counter when the basket is moved into place adjacent the scanner. Cooperating cam means are formed on the front and rear ends of the basket so that when a first basket front end is moved horizontally into engagement with a second basket rear end, the cam means cooperate to pivot the first basket about a horizontal axis to a nesting-facilitating position. The rear end cam means are defined in part by a child's seat. The handle is pivotally mounted to the child's seat for movement about a horizontal axis from an inoperative position wherein it hangs downwardly from the child's seat, to a second position wherein it blocks ingress to and egress from the child's seat and operates as a handle to facilitate pushing or pulling of the cart.

It is the primary object of the present invention to provide a checkout system for supermarkets and the like that facilitates checkout procedures that are as quick, simple, and efficient as possible. This and other objects of the invention will become clear from an inspection of the detailed description of the invention, and from the appended claims.

BRIEF DESCRIPTION OF THE DRAWINGS

FIG. 3a is a top schematic view illustrating use of the checkout counter of FIG. 1, and shopping cart according to the invention, in a typical checkout procedure;

FIG. 3b is a detail end view taken in the direction of arrow B in FIG. 3a;

DETAILED DESCRIPTION OF THE DRAWINGS

Figure 1:
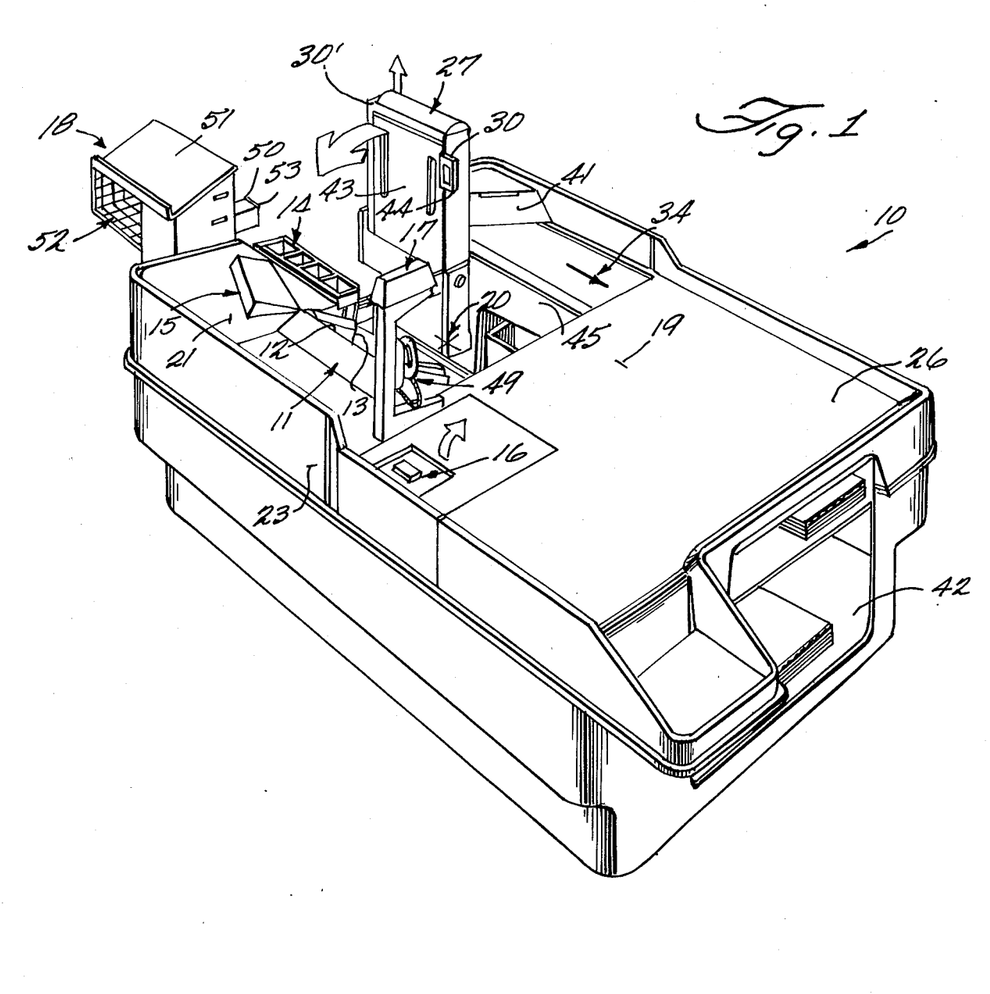
FIG. 1 is a top perspective view of an exemplary supermarket checkout counter according to the invention.

A supermarket-type checkout counter according to the present invention is shown generally by reference numeral 10 in FIG. 1. The counter includes the conventional components of a scanning means 11, including a scanner module 12 having a flat plate scanning surface 13; a cash drawer 14; a keyboard 15; a receipt printer 16; a digital readout display 17 for displaying scanned price information, and the like; and a check writing surface 18. Various walls and supports, including the first conveyance means 19, define a workplace 20 at which the operator will position himself/herself. Part of the workplace defining means comprise the generally horizontal surface 21 which supports the scanner means 11, keyboard 15, cash drawer 14, and the like. Other workplace defining components will be described hereafter.

One important aspect of the present invention is the mechanism by which merchandise is accessed for scanning by the operator positioned in the workplace 20. A generally flat, generally vertical wall portion 23 is provided on the opposite side of the scanner 11 from the workplace 20, and defines an open area adapted to receive an elevated basket shopping cart, such as the cart shown generally by reference numeral 24 in FIGS. 3a, 3b, 4 and 6. The operator merely reaches over the scanner 11—as illustrated in FIGS. 3a and 3b—grabs merchandise within the shopping cart 24, and moves it down over the flat plate 13 of the scanner so that indicia on the merchandise is read by the scanner, pricing and other information is displayed by the digital readout 17, an entry is made on a receipt by the printer 16, and an entry is made in an inventory control system.

Figures 3A, 3B:
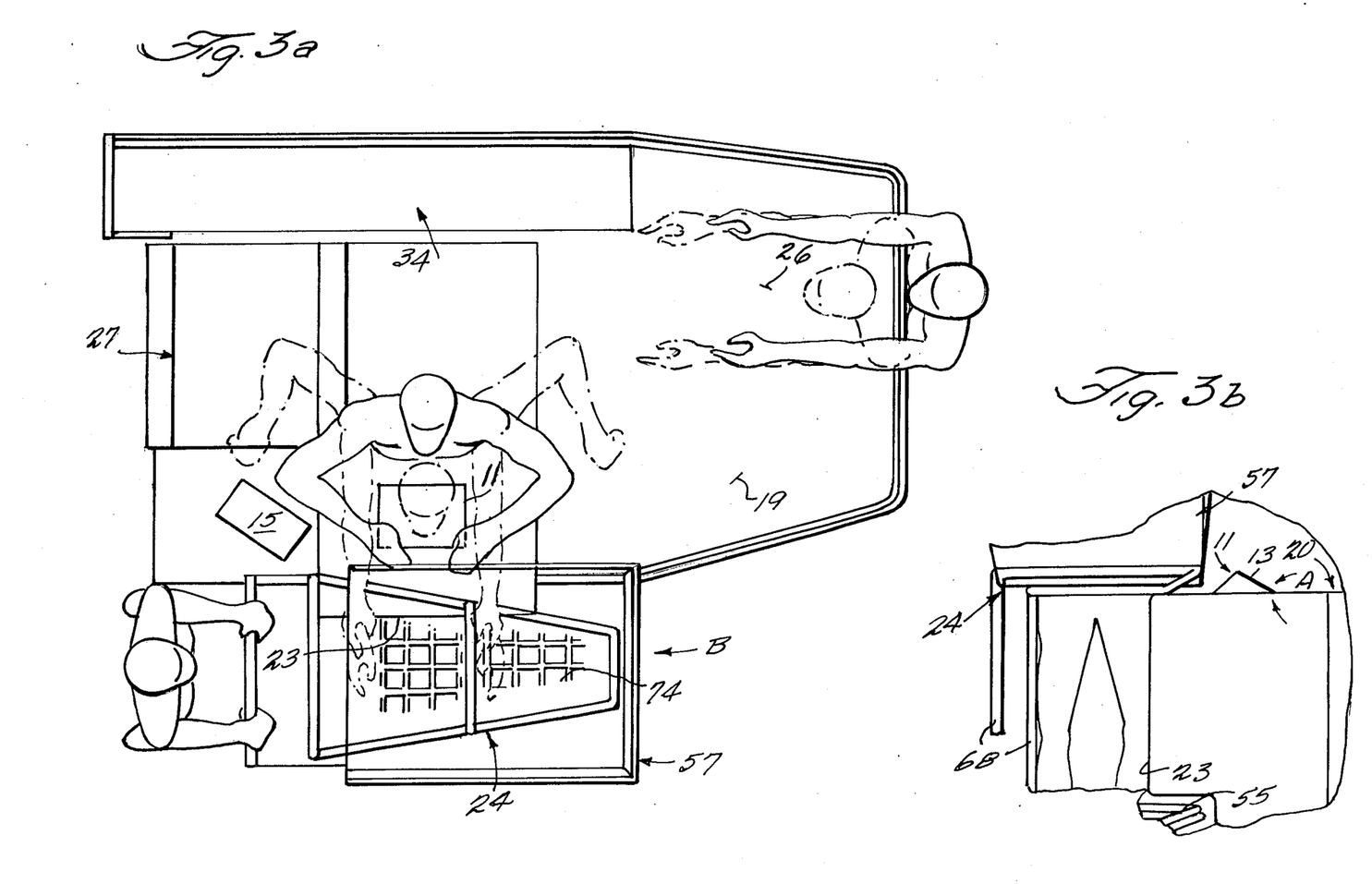

In order to facilitate the scanning operation, as seen most clearly in FIG. 3b the flat plate 13 of the scanner is angled toward the operator standing in the workplace 20. The scanner module 11 comprises means for positioning the flat plate 13 at an angle, such means includinfg a wall 22 of module 11 adjacent vertical wall 23, which wall 22 is higher than wall or edge 22' (see FIGS. 3a and 3b) of the module 11 adjacent the workplace 20. For instance the plate 13 is angled toward the operator an angle A which typically could be 10°–40°, e.g. 30°, from the horizontal. The exact angle will depend upon the relative dimensions of the other components of the counter and cart system, the purpose being to enhance the scanning procedure.

According to another important aspect of the present invention, conveyance of merchandise articles away from the scanner 11 is designed so that the operator may practice two-handed scanning procedures. This is accomplished according to the present invention by providing along a first side of the workplace 20 the conveyance surface 19, which preferably is a stationary generally horizontal surface (although slanted slightly downwardly from the workplace 20 toward the merchandise accumulation area 26—see FIG. 1). On the opposite side of the conveyance means 19 is provided a live first conveyor mechanism 27. The mechanism 27 preferably comprises a conventional conveyor belt 28 movable about rollers 29 received within housing 30 and powered by a conventional motor and belt drive 31 mounted in motor housing 32 having an access door 33.

The second conveyance path from the scanner 11 also comprises the second live conveyance mechanism 34 which is mounted on the opposite side of the workplace 20 from the scanner 11. The mechanism 34 also preferably comprises a conveyor belt, such as belt 35 disposed around rollers 36, and powered by motor 37 and belt drive 38. The belt 35, and like components, are conventional and mounted in a conventional housing portion 39.

In order to transfer merchandise from the first live conveyance mechanism 27 to the second live conveyance mechanism 34, a cover 40 for the conveyance mechanism 34, having a product diverter plate 41, is provided. The plate 41 comprises a generally vertically extending wall portion which facilitates movement of merchandise from conveyor belt 28 onto conveyor belt 35. The mechanism 27 is elevated slightly with respect to mechanism 34 to facilitate transfer of product from one to the other.

Conveyor belt 35 deposits merchandise into the common merchandise accumulation area 26. At the area 26 it may be bagged by a bagger, or the operator in workplace 20. A bag shelf 42 is adjacent the area 26, facilitating the bagging procedure.

In order to allow ready egress from and ingress into the workplace area 20, the conveyance mechanism 27 is mounted for pivotal movement about a horizontal axis from a generally horizontally extending, operative, position to an inoperative, generally upwardly extending position—which inoperative, egress—ingress allowing position is shown in FIG. 1. This may be accomplished by any suitable means, one conventional way for accomplishing it being illustrated in U.S. Pat. No. 4,392,553. Torsion spring 46 provides a counterweight action.

When the conveyance mechanism 27 is in its operative, generally horizontal position (see FIG. 3a), the bottom surface 30' (see FIG. 1) of housing 30 abuts a shelf portion (not shown) disposed below the cash drawer 14. In this position the cash drawer 14 may open without interfering with the conveyance mechanism 27.

Figure 2:
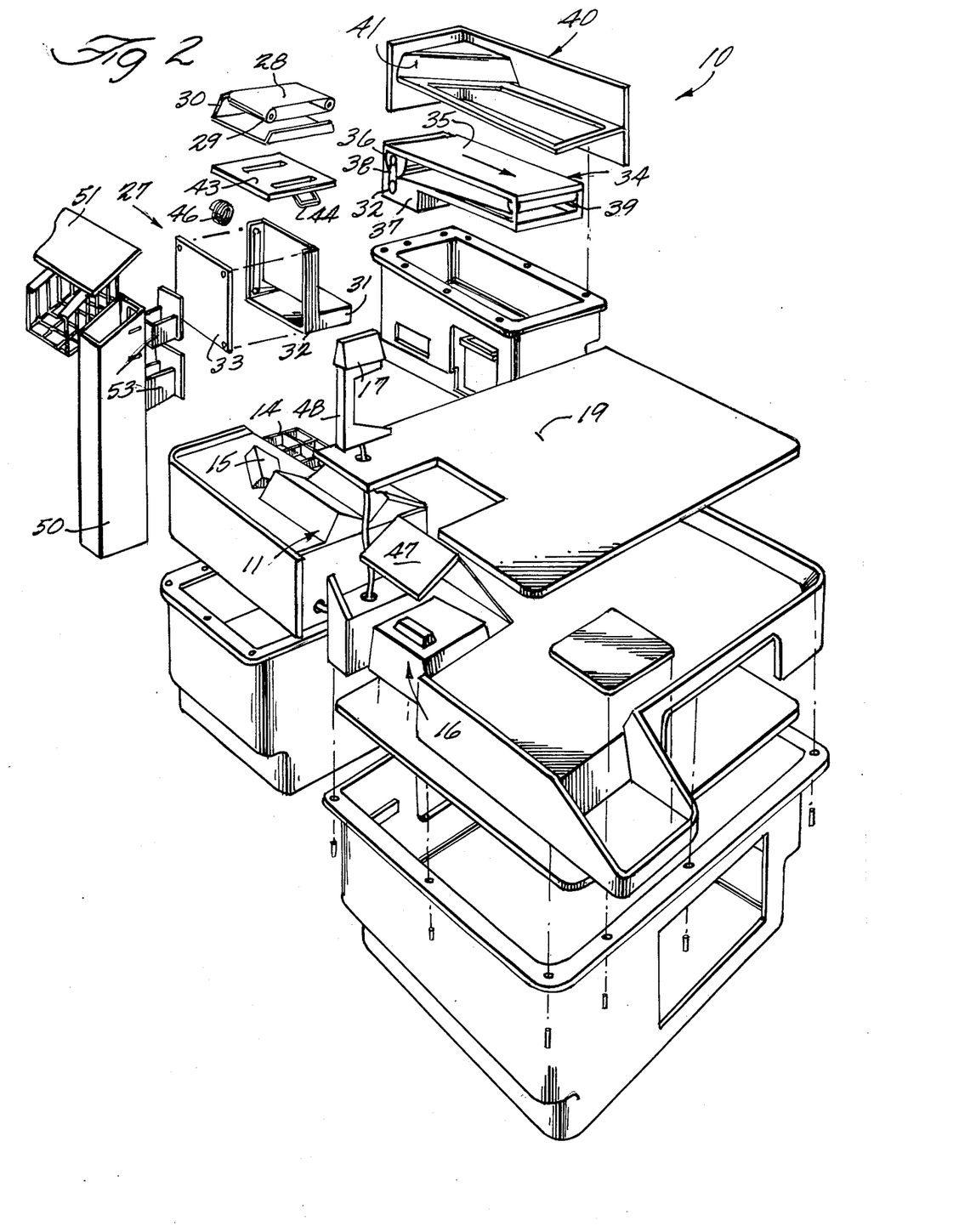
FIG. 2 is an exploded perspective view of the checkout counter of FIG. 1.

In order to lock the conveyance mechanism 27 in its egress-ingress allowing position (FIG. 1) the sliding lock plate 43 (see FIGS. 1 and 2) is provided. The operator grasps the handle 44 of the lock plate 43—which is mounted for sliding movement with respect to the bottom of the conveyor belt housing 30—and slides it into or out of locking engagement with the housing 32, which is stationarily mounted to the support 45 (see FIG. 1). The weight of the mechanism 27 itself holds it in place in its egress-ingress preventing position. In that position, mechanism 27 depresses a switch (not shown), which starts the motor for belt 28.

Additional accessory features which facilitate utilization of the supermarket counter 10 include the following: The printer 16 is mounted under the hinged cover 47. The digital readout display 17 is mounted by the vertical support column 48 so that it is above the surface 21, and so that the display 17 may be easily read by the operator in workplace 20, and the consumer. Support column 48 also provides the support for the intercom 49 (see FIG. 1). Adjacent the cash drawer 14 is a support column 50 for a check writing surface 51, which is angled for convenience of use, and which has a basket or shelf 52 mounted below it for receipt of personal articles of the consumer writing the check. The column 50 is preferably hollow and receives lockable drawers 53 in which cash, coupons, or the like can be disposed.

The shopping cart 24 according to the present invention is particularly adapted for use with the counter 10, although it may have some other uses. The cart 24 includes a wheeled base 55, a basket—indicated generally by reference numeral 57—a handle 58, and means—indicated generally by reference numeral 59—for supporting the basket so that it is elevated above the base 55, and so that the basket 57 is positioned for ready accessing by an operator standing in workplace 20, as clearly illustrated in FIGS. 3a and 3b.

Figure 4:
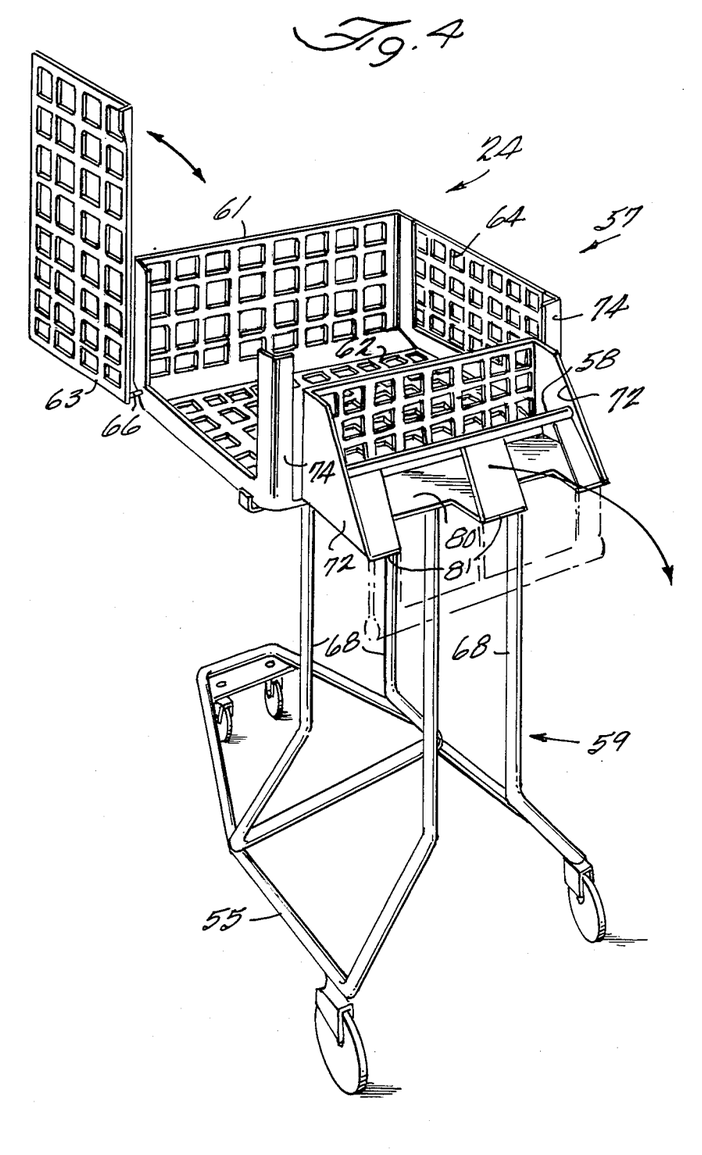
FIG. 4 is a top perspective view of an exemplary shopping cart according to the invention.

The basket 57 includes a front wall 61, a rear wall 62, a first side wall 63, and a second side wall 64. The handle 58 is operatively assocaited with, and positioned adjacent, the rear wal 62. In order to facilitate removal of merchandise from the basket 57 by the operator standing in workplace 20, the first side wall 63 is mounted so that it is movable from a first position wherein it defines the side wall of the basket 57, to a second position (see FIG. 4) wherein it does not define a side wall of basket 57, and allows ready access to merchandise therein. This mounting of the side wall 63 is preferably accomplished by a simple pivot pin 66 which pivots the side wall 63 for pivotal movement about a generally horizontally extending axis. As illustrated in FIG. 4, the axis of pivot pin 66 is preferably generally parallel to the front wall 61.

In order to properly support the basket 57, but so as not to interfere with the counter 10 during the checkout procedure, the supports 59 preferably mount the basket 57 in a cantilever manner. That is a plurality (e.g. four) vertically extending support columns 68 operatively support the basket 57 on the base 55 adjacent the second side walls 64 of the basket, and having top portions 69. The vertically extending components 68 of the support 59 are spaced from the first side wall 63, as can perhaps best be seen in FIG. 3b. In this way neither the basket 57, vertical supports 68, nor wheeled base 55 interfere with the wall 23 of the counter 10, the scanner 11, or any other component of the counter 10.

In order to facilitate nesting of one cart 24 with respect to another, preferably the bottom of the front end of each cart is provided with a cam means 70, while the rear of each cart is provided with a cam means 71. Further, the basket 57 is mounted for pivotal movement about a horizontal axis parallel to the front wall 61.

The basket 57 may be mounted for pivotal movement by a wide variety of mechanisms. One mechanism for doing this may best be seen with reference to FIGS. 5 and 6. The rear wall 62 of the basket, and side plate portions 72 thereof, are attached by bolts, welding, or the like to upper struts 69 of the support means 59. The basket wall 62 is distinct from the rest of the basket 57 components, including the frame 73 which is integral with the bottom 74 of the basket 57. Also the spacing between the side plates 72 is slightly less than the spacing between upright rear portions 74′ of bottom 74. Extending forwardly from the rear wall 62 are apertured projections 75, and extending rearwardly from basket base 74 are apertured projections 76. The apertures in the projections 75, 76 are adapted to receive a shaft 77 therein, the shaft 77 defining the horizontal axis about which the basket frame 73 pivots with respect to the base 55 and rear walls 62.

Figure 6:
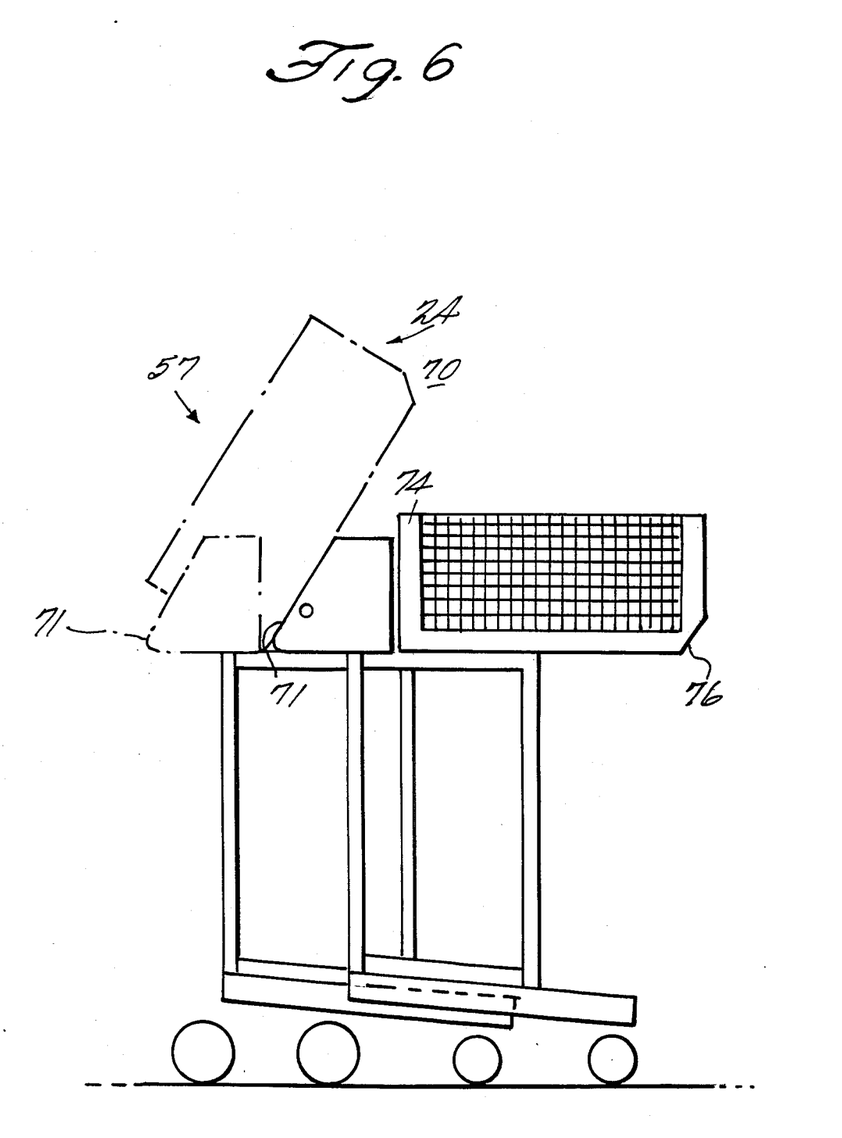
FIG. 6 is a side schematic view illustrating a nested position between a pair of shopping carts according to the invention.

To nest carts 24 according to the invention—as can best be seen with respect to FIG. 6—one merely linearly pushes a first cart 24 (left-hand cart in FIG. 6) so that the leading cam surface 70 thereof engages the rear cam surface 71 of the basket in front of it (right-hand basket in FIG. 6), the cam surfaces 70, 71 cooperating to cause the basket 57 of the first cart to pivot about the axis defined by shaft 77 to the upright position illustrated for the first cart basket in FIG. 6.

The rear walls 62 and side plates 72 preferably define a child's seat, including sitting surface 80 (see FIG. 4). The handle 58 preferably cooperates with the child's seat and provides the front bar thereof. As can be seen from FIGS. 4 and 5, the handle 58 is preferably pivotally mounted about a horizontal axis defined by hinge means 81 for movement from an inoperative, downwardly extending position (dotted line in FIG. 4 and solid line in FIG. 5) wherein it allows ready egress from and ingress to the child's seat 80, to a second, operative position (solid line in FIG. 4, top dotted line position in FIG. 5) wherein it blocks egress from and ingress to the child's seat, holding the child in place within the seat, and functions as a handle for facilitating pushing or pulling of the cart. In the operative position (solid line in FIG. 4), the handle 58 is latched by any suitable conventional latching or detent means (not shown) to the side plates 72.

Figure 5:
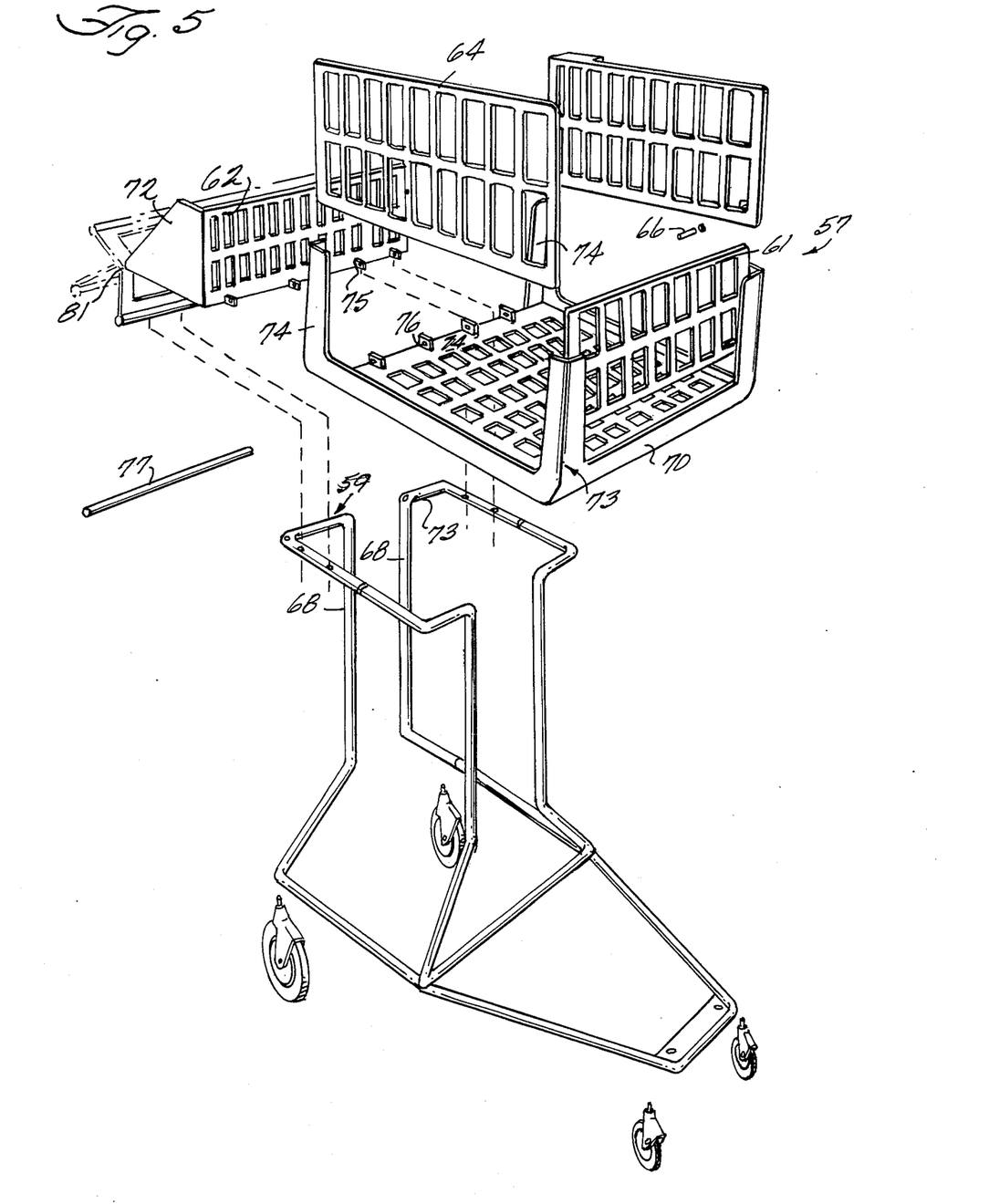
FIG. 5 is an exploded perspective view of the basket components of the shopping cart of FIG. 4.

If desired, the front wall 61 and second side wall 64 of the basket 57 may be mounted so that they are removable, as illustrated in FIG. 5. This may be done by providing a suitable slide means associated with the vertical supports of the basket frame 73 with which the walls 61, 64 cooperate, as seen in FIG. 5.

OPERATION

An exemplary utilization of the counter 10 and shopping cart 24 according to the invention will now be described.

An operator walks into the workplace area 20, grasps the handle 44 of the slide plate 43, and slides it upwardly, and then pivots the conveyance mechanism 27 so that it is down and in operative position. The conveyance mechanisms 27, 34 are then turned on by any suitable control means, and the rest of the components of the system are activated, such as the keyboard 15, scanner 11, and printer 16.

A customer wheels his/her cart (see FIGS. 3a and 3b) to a position wherein the first side wall 63 of the cart 24 is adjacent the scanner 11. The operator grabs the side wall 63, and rotates it about the axis defined by pivot pin 66 to the access-allowing position (see FIG. 4). The operator then grasps merchandise articles within the cart 24, and moves them one by one, but in a two-handed manner, over the flat plate 13 of the scanner 11. Articles moved over the scanner with the operator's left hand are conveniently positioned on stationary conveying surface 19, while articles moved over the scanner with the operator's right hand are conveniently positioned on the conveyor belt 28. Articles on surface 19 move generally down the slope thereof to the merchandise accumulation area 26. While articles deposited on conveyor belt 28 are moved into engagement with diverting wall 41, onto conveyor 35, and ultimately also deposited in area 26.

During the scanning operation, the display 17 displays the price and item information to the consumer, who is standing check adjacent writing table 51. Items that cannot be scanned are keyboarded in, utilizing keyboard 15, by the operator. A receipt is simultaneously printed by the printer 16.

Once the consumer's merchandise has been entered into the calculating system, the final amount due is displayed on the readout 17, the consumer writes a check on the surface 51, putting hand held articles in the basket 52, the check is given to the operator, the operator accesses the cash drawer 14 and puts the check in place, and the transaction is completed. The consumer then walks to the part of counter 10 adjacent the area 26, and picks up his/her merchandise, which has already been bagged either by a bagger (as shown in FIG. 3b), or by the checkout person herself/himself.

It will thus be seen that according to the present invention mechanisms have been provided for facilitating quick, simple, and effective checkout procedures from a supermarket or the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A supermarket-type checkout counter comprising:
   indicia scanning means for scanning indicia disposed upon goods moved into operative association therewith, said scanning means mounted in a scanner module;
   a keyboard;
   a cash drawer;
   means for defining a workplace at which an operator may be positioned to use said scanning means, keyboard, and cash drawer, said workplace defining means including conveyance means for facilitating conveyance of goods moved into operative association with the scanning means away from the scanning means, said conveyance means including first and second conveyance path means, the first path means disposed along a first side of said workplace and leading to a merchandise accumulation area, and the second conveyance path means comprising first and second moving conveyors disposed at an angle to one another for conveying merchandise along a second side opposite said first side, and behind said workplace and generally perpendicular to said second side and opposite said scanner module, said second path means also leading to said merchandise accumulation area;
   a generally vertical wall portion mounted on the opposite side of said scanner module as an operator positioned in said workplace, said generally vertical wall portion including means defining an open area for receipt of a shopping cart so that items within the shopping cart are readily accessible to an operator standing in the workplace and reaching over the scanner module, and are movable downwardly over the scanner module; and
   wherein said scanning means comprises a generally flat plate portion disposed in said scanner module, and wherein said scanner module comprises means for positioning said generally flat plate portion so that it makes an angle in the range of substantially 10°–40° with respect to the horizontal and is angled toward an operator positioned in the workplace, being higher away from said workplace than adjacent said workplace, for facilitating utilization of the scanning means by the operator.

2. A counter as recited in claim 1 wherein said flat plate portion makes an angle of substantially 30° with respect to the horizontal.

3. A counter as recited in claim 1 further comprising digital readout means for displaying price and other indicia, said digital readout means mounted on a support so that it is elevated with respect to said scanner module and is positioned to be readily viewed from said workplace and by a customer positioned on the opposite side of said scanner module from said workplace.

4. A counter as recited in claim 3 further comprising intercom means mounted on said support for said digital readout means.

5. A counter as recited in claim 3 further comprising a check writing stand positioned adjacent said cash drawer and on the opposite side of said scanner module from said digital readout means.

6. A counter as recited in claim 1 wherein said first path means comprises a stationary generally horizontal surface.

7. A counter as recited in claim 3 wherein said flat plate portion makes an angle of substantially 30° with respect to the horizontal.

8. A supermarket-type checkout counter comprising:
   indicia scanning means for scanning indicia disposed upon goods moved into operative association therewith, said scanning means mounted in a scanner module;
   a keyboard;
   a cash drawer;
   means for defining a workplace at which an operator may be positioned to use said scanning means, keyboard, and cash drawer, said workplace defining means including conveyance means for facilitating conveyance of goods moved into operative association with the scanning means away from the scanning means, said conveyance means including first and second conveyance path means, the first path means being disposed along a first side of said workplace and leading to a merchandise accumulation area, and the second conveyance path means comprising first and second moving conveyors disposed at an angle to one another for conveying merchandise along a second side opposite said first side, and behind said workplace and generally perpendicular to said second side and opposite said scanner module, said second path means also leading to said merchandise accumulation area; and
   wherein said scanning means comprises a generally flat plate portion disposed in said scanner module, and wherein said scanner module comprises means for positioning said generally flat plate portion so that it makes an angle in the range of substantially 10°–40° with respect to the horizontal and is angled toward an operator positioned in the workplace, being higher away from said workplace than adjacent said workplace, for facilitating utilization of the scanning means by the operator.

9. A counter as recited in claim 8 further comprising means for rotatably mounting said first moving conveyor so that said first moving conveyor is rotatable about a horizontal axis to move from a first, conveyance, position blocking egress from and ingress to said workplace, to a second position allowing egress from and ingress to said workplace.

10. A counter as recited in claim 8 wherein said first path means comprises a stationary generally horizontal surface.

11. A counter as recited in claim 8 wherein said flat plate portion makes an angle of substantially 30° with respect to the horizontal.

12. A counter as recited in claim 8 further comprising a generally vertical extending wall portion disposed at an angle with respect to said first and second moving conveyors for facilitating conveyance of merchandise from said second side of said second path means to behind said workplace.

13. A supermarket-type checkout counter comprising:
   indicia scanning means for scanning indicia disposed upon goods moved into operative association therewith, said scanning means mounted in a scanner module;

a keyboard;

a cash drawer;

means for defining a workplace at which an operator may be positioned to use said scanning means, keyboard, and cash drawer, said workplace defining means including conveyance means for facilitating conveyance of goods moved into operative association with the scanning means away from the scanning means; and wherein said conveyance means comprises first and second conveyance path means, the first path means being disposed along a first side of said workplace and leading to a merchandise accumulation area, and the second conveyance path means comprising first and second moving conveyors disposed at an angle to one another for conveying merchandise along a second side opposite said first side, and behind said workplace and generally perpendicular to said second side and opposite said scanner module, said second path means also leading to said merchandise accumulation area.

14. A counter as recited in claim 13 further comprising means for rotatable mounting said first moving conveyor so that said first moving conveyor is rotatable about a horizontal axis to move from a first, conveyance, position blocking egress from and ingress to said workplace, to a second position allowing egress from and ingress to said workplace.

15. A counter as recited in claim 3 further comprising a generally vertically extending wall portion disposed at an angle with respect to said first and second moving conveyors for facilitating conveyance of merchandise from said second side of said second path means to behind said workplace.

16. A counter as recited in claim 13 wherein said first path means comprises a stationary generally horizontal surface.

17. A counter as recited in claim 16 further comprising a generally vertically extending wall portion disposed at an angle with respect to said first and second moving conveyors for facilitating conveyance of merchandise from said second side of said second path means to behind said workplace.

* * * * *